UNITED STATES PATENT OFFICE.

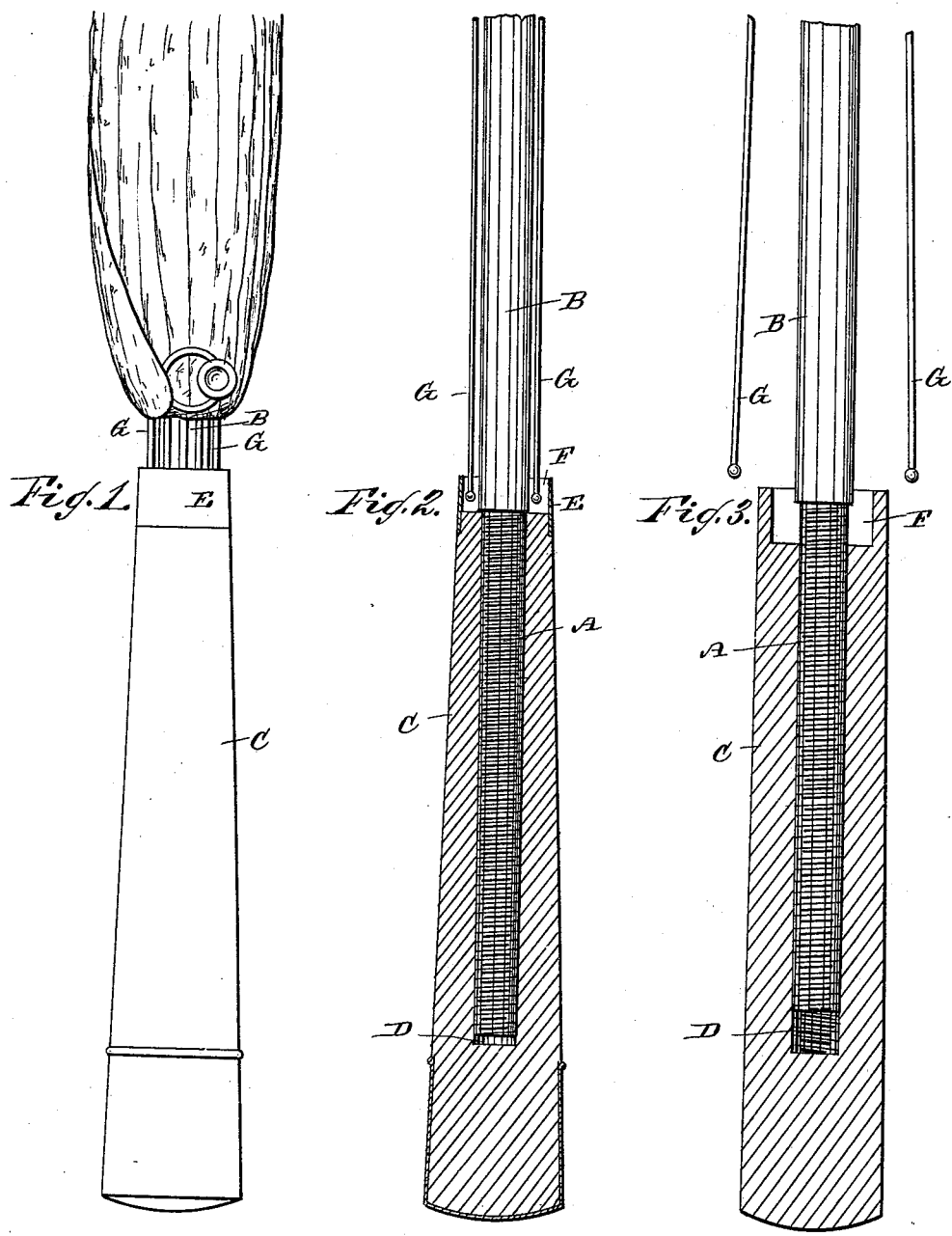

ALBERT T. SCHLICHTING, OF NEW YORK, N. Y.

UMBRELLA-HANDLE.

SPECIFICATION forming part of Letters Patent No. 335,314, dated February 2, 1886.

Application filed November 11, 1884. Serial No. 147,627. (No model.)

*To all whom it may concern:*

Be it known that I, ALBERT T. SCHLICHTING, of the city, county, and State of New York, have invented certain new and useful Improvements in Umbrella-Handles, of which the following is a full, clear, and exact description.

The object of my invention is to facilitate holding the outer or headed ends of the umbrella-ribs against the stick when the umbrella is closed.

The invention consists in an umbrella-handle arranged to move on the stick in the direction of its length, and which is provided in its inner end with an annular cavity or with a projection forming a cavity for receiving and holding the headed ends of the umbrella-ribs when the umbrella is closed.

Reference is to be had to the accompanying drawings, forming part of this specification, in which similar letters of reference indicate corresponding parts in all the figures.

Figure 1 is a side view of my improved umbrella-handle, the umbrella being closed. Fig. 2 is a longitudinal sectional elevation, the umbrella being closed. Fig. 3 is a longitudinal sectional view of a modification, the umbrella-ribs being released ready for opening the umbrella.

The lower end, A, of the umbrella-stick B is screw-threaded, and is screwed into the handle C, which is provided with a longitudinal screw-threaded aperture, D, adapted to receive the threaded end A of the stick, and extending from the inner end of the handle to or near the base end of the same. On the inner end of the handle a collar or ring, E, is secured which projects a greater or less distance beyond the inner end of the handle, thereby forming a cavity, F, at the inner end of the handle, as shown in Figs. 1 and 2, or the inner end of the handle is turned out to form the cavity F, as shown in Fig. 3.

By turning the handle C it is moved in the direction of the length of the stick and its own length. By unscrewing the handle it is withdrawn a short distance, and permits of folding the free or headed ends of the ribs G against the stick. The handle is then screwed on the stick that is turned in the inverse direction and is moved toward the lower end or point of the stick, whereby the free ends of the ribs are brought into the cavity F, and are thus held against the stick and prevented from spreading.

If desired, the handle may be arranged in any other suitable manner to slide in the direction of the length of the stick, and the handle may have any desired shape or size.

Having thus described my invention, what I claim as new, and desire to secure by Letters Patent, is—

The combination, with an umbrella-stick having its lower end screw-threaded, of a handle having a screw-threaded aperture and provided with a cavity for receiving the free ends of the umbrella-ribs, which handle is screwed on the screw-threaded end of the stick and by turning it in either direction can be moved toward or from the ends of the ribs for the purpose of holding or releasing them.

ALBERT T. SCHLICHTING.

Witnesses:
OSCAR F. GUNZ,
C. SEDGWICK.